Figure 1:
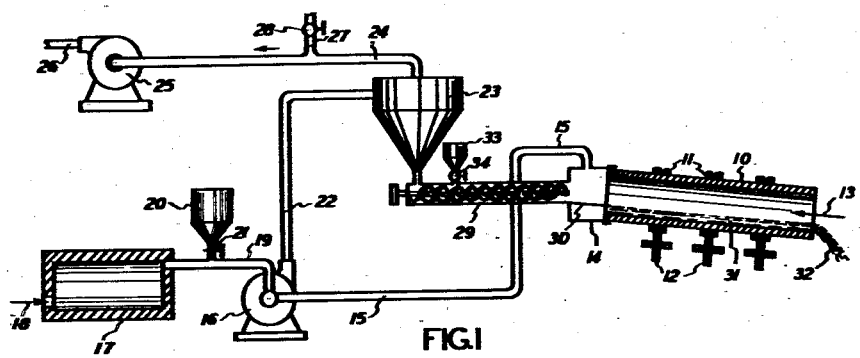

July 10, 1934.  McKINLEY STOCKTON  1,966,362

METHOD OF CALCINING DIATOMACEOUS EARTH

Filed March 29, 1934

McKINLEY STOCKTON
INVENTOR

ATTORNEY

Patented July 10, 1934

1,966,362

UNITED STATES PATENT OFFICE

1,966,362

METHOD OF CALCINING DIATOMACEOUS EARTH

McKinley Stockton, Redondo Beach, Calif., assignor to The Dicalite Company, Los Angeles, Calif., a corporation of Delaware Application March 29, 1934, Serial No. 718,097

14 Claims. (Cl. 252—2)

The herein described invention pertains to the art of burning, calcining or roasting subdivided mineral substances and has for its object an improvement in the temperature conditions in the kilns used for that purpose.

In the art of calcining powdered mineral materials such as diatomaceous earth, it is customary to pass a stream of the powder through a slowly rotating cylinder lined with refractory material, in counterflow to a stream of combustion products generated in or adjacent to that end of the kiln from which the heat treated mineral is withdrawn.

For convenience this end of the kiln will hereinafter be termed the outlet end and the point at which the feed of mineral is introduced as the inlet end.

The cylinder, which is usually of considerable length, is set with a slight slope toward the outlet end, and the time of residence of the mineral in the kiln is controlled by the slope, the rate of rotation and the rate of feed. In all cases the layer of mineral, which constantly seeks the lower side of the revolving cylinder, occupies only a part of its cross-sectional area.

The conventional rotary kiln above described has long been in use and is well known and understood, and the instant invention does not contemplate any improvement in the kiln itself but is concerned solely with the manner in which it is manipulated and the materials with which it is fed.

The most serious difficulty encountered in the use of the rotary kiln for many purposes has been the lack of control over the temperature gradient. Due to the great length as compared with the diameter and to the fact that it is in rotation when operating it is difficult if not impracticable to introduce the heating flame elsewhere than into the outlet end, and the result of this structural limitation is the production of a relatively short zone of high temperature and a sharp decline from its maximum toward the inlet end of the kiln.

In most of the operations conducted in rotary kilns the achievement of the desired result is a function in which time and temperature are to some extent interchangeable. For example, a degree of calcination of diatomaceous earth which is produced in a short time at a high temperature may also be produced at a lower temperature in a longer time. It does not follow, however, that the total results produced are identical. Elevation of temperature has usually some definite limit fixed by undesired alterations in the character of the product or by the introduction of serious operating difficulties.

As example, a diatomaceous earth which has been calcined at a uniform temperature of say 1700° over a relatively long period is intrinsically a more desirable product than that resulting from the calcining of the same earth at 2000° for a shorter time, even though the degree of calcination, as measured by the hardening and toughening of the product, be exactly the same.

Where the earth is heated to a higher temperature than is absolutely necessary and the heating time thereby reduced, the extent to which the earth stream is turned over and redistributed in the zone of maximum temperature is correspondingly reduced. Under such conditions there is a strong tendency for the superficial portions of the earth stream, which come into direct contact with the flame, to be overheated while other portions are underheated. Such lack of uniformity in heating is highly detrimental to the quality of the calcined product.

I have discovered that by introducing into the kiln, in liquid or solid form and in intimate admixture with the material to be heated, a portion only of the total amount of fuel required for the heat treatment, I am enabled to greatly lengthen the zone of maximum temperature in any given kiln, thus producing a much longer residence of the mineral in this zone. In thus lengthening the maximum temperature zone I am enabled at will either to greatly increase the throughput of the kiln or to lower the maximum temperature for the improvement of the quality of the product, and also to materially increase the uniformity of burning. I have also discovered that by varying the ratio between intermixed fuel and fuel burned in the outlet end flame and by varying the amount of excess air I am enabled to place the zone of maximum temperature at any desired point in the length of the kiln and to effect other desirable controls not heretofore available.

Figure 2:
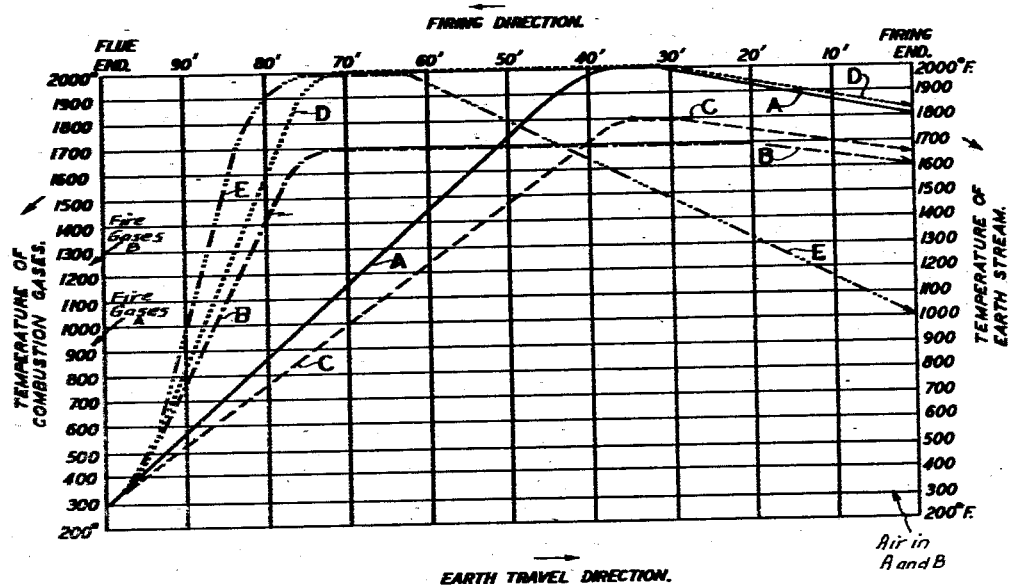

The manner in which the invention is put into practice may best be described in connection with a typical heat treatment of diatomaceous earth and with reference to the attached drawing, in which Figure 1 diagrammatically illustrates a suitable combination of apparatus and the flow of materials therethrough, and Figure 2 is a diagram illustrating by means of curves the temperature gradients within a rotary kiln of commercial size under different methods of operation.

Referring first to Fig. 1, a rotary kiln is indicated at 10, this kiln revolving on its longitudinal axis on bearing rings 11 and trunnions 12. A burner for the injection and combustion of a preferred fuel, which may be liquid, gaseous or a pulverized solid, is indicated by the arrow 13. All the above arrangements are entirely conventional.

The remainder of the apparatus is particularly adapted to the handling of diatomaceous earth and might be materially modified for other purposes. A stationary breeching 14 surrounds the inlet end of the kiln and is provided with a flue 15 extending to the suction side of an air blower 16. A furnace or firebox 17 provided with a fuel burner 18 supplies hot air and combustion gases to a flue 19 by which these gases also are conducted to the suction of blower 16.

The earth to be calcined is introduced into the hot gases at any convenient point in the length of conduit 19, as for example from a bin 20 and through a regulating or metering means 21. The earth is thus placed in suspension in the mixture of gases from the furnace and this suspension, together with the flue gases drawn from the kiln through flue 15, is discharged through a flue 22 into a cyclone or other separator 23.

From the top of the separator a flue 24 leads to the suction of a blower 25 which discharges dust and cooled gases to a baghouse or any other desired point through a conduit 26. If preferred the use of a baghouse may be dispensed with by introducing a stream or spray of water into flue 24 as by means of pipe 27 and valve 28, this addition precipitating the dust from the gas stream.

By contact of the earth with the hot gases in blower 16 and flue 22 it is reduced to a desired state of dessication, the water vapor thus produced passing with the cooled gases from separator 23 through conduit 24. The dried powdered earth collecting in the separator is continuously removed as by a screw conveyer 29 and is discharged over an apron 30 into the inlet end of kiln 10, in which it forms a layer 31 which gradually moves down the length of the kiln and is discharged as at 32 into any desired form of receptacle or conveyor.

The addition of solid or liquid fuel to the earth may be made in conveyor 29. Thus, a liquid fuel may be drawn into the conveyor from a tank 33 through a pipe and valve 34, while if a pulverized solid fuel such as coal is to be added, 33 may be taken to represent a bin and 34 a small conveyor or feed screw. The primary conveyor 29 must be of such construction as to thoroughly intermix and blend the fuel with the earth and for this purpose it may be provided with a broken instead of a continuous screw or with pitched arms spirally arranged on a shaft, or any of the numerous devices for intermixing liquids with solids or solids with other solids may be substituted. Whatever device is used, it is desirable that the fuel be intimately intermixed with and dispersed through the mineral to be treated.

In general terms, any liquid or solid combustible substance may be utilized for admixture with the mineral, but for specific purposes some fuels may be preferable to others. For this use we may distinguish four classes of fuel:

*a*—substances which may be completely volatilized, such as heavy petroleum distillates or crudes free from asphalt.

*b*—substances which partly volatilize, leaving a cementitious residue, such as asphalt, crude asphaltic oils and caking coals.

*c*—substances which partly volatilize and leave a discrete residue, such as noncaking bituminous coals, lignites, oil shales, vegetable fibres and sawdust, and diatomaceous shales containing bitumen or other organic matter.

*d*—substances which are substantially nonvolatile, such as anthracite, cokes and other forms of dry carbon.

Also in some cases the quantity and characteristics of the ash may be a consideration.

The fuels of class *a* are particularly desirable for the calcination of diatomaceous earth as they burn out completely, leave no stain to depreciate the desired color, are noncementing and are dispersed through the earth with great readiness.

The fuels of class *b* may not be desirable for use with diatomaceous earth or other very light materials as in drying out to coke they have a tendency to agglomerate and cement the powder into masses which are not readily broken down by the tumbling action of the kiln.

Of the fuels of class *c*, sawdust is probably the most desirable for use in calcining diatomaceous earth, because of the porosity and ready combustibility of the charcoal particles left on destructive distillation of the wood. In this same class the highly organic diatomaceous shales found on the Pacific coast and elsewhere and containing sufficient bituminous or coaly matter to have a material fuel value are desirable for admixture with earth free from combustible elements. For reasons which will appear it is seldom possible to calcine this material alone as, unless it contains exactly the correct proportion of combustible, it must be intermixed either with further fuel or with other earth containing less or no combustible. Also, it cannot be used unless it is of such friability as to be capable of reduction to a finely powdered form, nor unless its mineral residue consists of a usable diatomaceous structure.

Under some circumstances the noncaking bituminous coals, lignites, and oil shales (as found in Utah for example) may be more suitable on the score of cost and availability.

All of the fuels of the first class and many of the second and third are so rich in volatiles that their use is wasteful unless the apparatus be provided with the regenerative devices later referred to.

The fuels of class *d* are suitable for any use, though anthracite and the harder varieties of coke may be found rather slow burning and will require extremely fine grinding. Petroleum cokes from either distillation or cracking operations, and the retort cokes, are free from this drawback and are desirable fuels where available. The fuels of this class do not require the use of the regenerative step just mentioned.

The curves shown on Fig. 2 graphically illustrate the differences between the temperature gradients resulting from firing a certain rotary kiln in the customary manner and those resulting from the application of the methods here described. This particular kiln is 100 feet in length and when fired in the usual manner, the greatest length of flame which can be maintained is about 35 feet, the point of maximum temperature coinciding with the position of the tip of the flame.

The inlet and outlet temperatures of the earth and of the counterflowing gases, as shown by curves A and B, are from thermo-couple readings, but the intermediate temperatures are estimates based on the color of the kiln wall and the charge at various points in the length.

The tests illustrated by curves A and B were designed to produce from a certain crude diatomaceous earth a calcined earth having the lowest possible specific weight and the highest possible flow rate when used as a filter aid. It has been found that, in this particular kiln and with this particular earth, the best results attainable when firing in the usual manner are produced by maintaining an earth outlet temperature of about 1800° F., a maximum temperature at the tip of the flame of about 2000° (earth temperature) and a fire-gas outlet temperature of about 1000°. In these two tests the air supply, rate of rotation, and rate of feed were held constant. The total time of residence in the kiln during both tests was about 45 minutes.

In the first test the ordinary method of firing was followed, that is to say, the heat was supplied solely by flame produced in the outlet end of the kiln and no fuel was intermixed with the feed. Curve A represents the temperature gradient in the kiln during this test, and the characteristics of this curve are common to the operation of rotary kilns fired in the conventional manner. These characteristics are: a substantially straight line rise in temperature from the inlet end to the tip of the flame, due to heat interchange between fire gases and earth, and a slight decline from the zone of maximum temperature at the flame tip to the outlet end, due to contact with somewhat cooler gases. In this particular instance the feed entered at about 300° F., the temperature at the flame tip was approximately 2000° and the earth outlet temperature 1800°. The temperature of the fire gas leaving the inlet end of the kiln closely approximated 1000° F.

In the second test 5% by weight of California Diesel fuel (27° Be) was incorporated with the entering feed of earth, in the manner above described, and a corresponding reduction made in the amount of fuel burned in the injection flame. The flame was thus shortened to about 20 feet. Curve B represents the temperature gradient in the kiln during this test and in others of like character, and the characteristics of this curve are believed to be common to the operation of rotary kilns with the intermixture of a portion of the fuel with the entering charge and the combustion of the remainder in a flame in the outlet end of the kiln. These characteristics are: the rapid heating of the charge by combustion of the intermixed fuel close to the inlet end of the kiln, the maintenance of this temperature to the tip of the shorter flame, a somewhat lowered maximum temperature due to the cooling of the flame by excess air (which follows from the reduction in amount of injected fuel while maintaining a constant air supply) and a slight lowering of temperature between the tip of the flame and the outlet end.

While the exact location of points on these curves are good only for these specific tests, the figures taken from them indicate, at least in part, the reasons for the marked improvement in results following from the maintenance of the temperature gradient illustrated by curve B.

The minimum temperature of calcination of the particular diatomaceous earth used in these tests lies between 1500° and 1600° F. and only that portion of the total time of residence in the kiln during which the earth is at or above 1500° is effective heating time.

As shown by curve A, the earth without intermixed fuel reached 1500° at a point 58 feet from the discharge end of the kiln and was maintained at or above that temperature until discharged. As shown by curve B, the earth intermixed with fuel reached the same temperature at a point 78 feet from the outlet end. As the rate of travel through the kiln is uniform, the time of effective heating is increased in the ratio 58:78 or 1.00:1.34.

This increase of 34% in the effective heating period permitted the realization of full calcination effect in test B at a maximum temperature 300° lower than that required in test A, and by this extension in the length of the effective zone and by the reduction in flame temperature, hot spots are avoided and the earth heated much more uniformly than in the first test.

The beneficial effects of the changed conditions on the quality of the product are strikingly shown in the following figures, in which columns A and B show the properties of the calcined earths from the corresponding tests, while column C refers to a test similar to test B in every respect except that fine sawdust was substituted, in equal quantity, for the Diesel fuel.

|  | Test A | Test B | Test C |
|---|---|---|---|
| Flow rate, relative | 1.00 | 1.61 | 1.66 |
| Density, pounds per cu. ft. | 17.9 | 14.0 | 14.3 |
| Oil absorption factor | 2.78 | 3.68 | 3.14 |
| Acid soluble, per cent | 1.9 | 1.7 | 1.2 |

It should be noted that the crude earth from which all of these products were made has a relative flow rate of about 0.20 or one-fifth that of product A, and is a low grade crude which is difficult to bring up to specification limits. The values indicated by these figures are, therefore, relative rather than positive, and illustrate the extent of the improvement in character of product produced solely by the change in the method of firing, all other elements of the treatment being the same in all the tests. It will be evident that an increase of over 60% in flow rate, a decrease of nearly 20% in density, a material increase in the oil absorption and a simultaneous decrease in acid solubility, constitute a result not only entirely unexpected but also of the greatest value.

That these results cannot be produced by merely lowering the maximum temperature while firing at the outlet end in the customary manner is evident on inspection of curve C of Fig. 2. The characteristics of this curve, in which the maximum temperature is 1800°, are the same as those of curve A but the effective heating length of the kiln is reduced to 49 feet and the result is a partially calcined material of much reduced value.

The test illustrated by curve B is one in which the throughput is not increased, the greater effective heating time being utilized to reduce the maximum temperature and thus increase the value of the product. The same principles may, however, be utilized for increasing the throughput of the kiln.

For example, if the material being treated would stand a temperature of say 2000° without depreciation of quality while this temperature could not be materially exceeded without some undesirable secondary effect such as the formation of slag rings, it would be possible to increase the amount of both injected and intermixed fuels to produce a gradient curve such as curve D, having the same characteristics as curve B but with its flat portion on the 2000° instead of the 1700° line. This extension of the zone of maximum temperature would obviously permit a very great increase in the rate at which the mineral might be passed through the kiln, provided the general rule of equivalence of time and temperature held good in the specific instance, and up to the point where the increase in velocity of gases through the kiln began to carry away the charge.

The possible increase in throughput capacity thus realizable will vary with the nature of the material and the structural features of the individual kiln and thus cannot be generalized. It may be stated, however, that in the particular kiln above referred to and operating on diatomaceous earth it is possible to increase the throughput from 25% to 50% while still producing an earth of materially improved tests, and there is reason to believe that with materials less sensitive to temperature variations and of greater weight it will be possible to at least double the throughput of many existing kilns by merely supplying fuel mixing means and provisions for an increased air supply.

The simultaneous introduction of intermixed fuel to one end of the kiln and of flame to the opposite end offers the opportunity for closely controlling and for widely varying the temperature gradient. The amunt of heat supplied to the inlet end of the kiln depends not only on the amount of fuel supplied to that end but also on the relative combustibility of the fuel and on the amount of free oxygen with which it is brought into contact. The zone of maximum temperature may be shortened by increasing the proportion of the total fuel which is burned in the injected flame and by reducing the air supply to that required for complete combustion of all the fuel, and it may be lengthened by increasing the proportion of intermixed fuel and supplying sufficient air for its rapid combustion, and by choosing a rapidly combustible fuel for the intermixture. These controls, by means of which the zone of maximum temperature may not only be lengthened and shortened but may also be moved from one end of the kiln to the other, are not available where the heat is introduced into only one end of the kiln.

In the selection of a fuel for any specific purpose the ash must be considered as to its effects on the material to be calcined. For example, in the calcination of diatomaceous earth the specific density would be adversely affected by the addition of a large amount of a heavy ash, while the color would be depreciated by an ash carrying large proportions of iron. On the other hand, many fuels yield a highly alkaline ash which is available as a so-called "flux" for discharging the color of the iron compounds existing in the earth and for the production of a white or light colored product, and where such fuels are available the addition of other fluxing agents may be partially or entirely avoided.

It should be pointed out that, at least for the calcination of diatomaceous earth, from which the last trace of the carbonaceous fuel residue must be removed, it is essential that a solid fuel which is to be intermixed wth the charge must be reduced to a stage of extreme comminution. The fineness required will vary with the nature of the carbonaceous residue produced by the driving out of any volatile matter which may be present, and fuels which yield a light and porous coke or char may be materially coarser than those in which the residue is more dense. Thus, sawdust may be utilized in 50 to 60 mesh or even coarser, lignites and bituminous coals in say 100 mesh, while anthracite, hard cokes and other dense forms of carbon should be comminuted to pass 200 mesh to produce the best results.

When using for intermixture either a wholly volatile fuel such as petroleum distillate or a partially volatile fuel such as a fat coal, it is often found that rapid volatilization and incomplete combustion occur in the extreme rear or inlet end of the kiln, producing great quantities of soot. This not only constitutes a serious nuisance, if the combustion products are carried to a stack, but is also the source of a serious waste of fuel.

By making use of the return flue 15, the blower 16 and the separator 23, as shown in Fig. 1 of the drawing, the sooty combustion gases are brought into intimate contact with the entering mineral, by which means the soot is collected on the surfaces of the grains and returned to the kiln and the gases are discharged substantially soot free.

While this operation is by no means essential to the successful practice of my invention, as it may be avoided by using a less volatile or nonvolatile fuel, it is highly useful where soot yielding fuels are preferable for other reasons. It is particularly desirable in the treament of diatomaceous earth because of the film of readily combustible soot thus caused to surround each earth particle, this soot igniting at a relatively low temperature and assisting in producing a temperature curve extremely steep at its rising end.

When using fuels containing little or no volatile combustible the advantage in the use of this regenerative apparatus disappears and the layout may be reduced to such bins and conveyors as are ordinarily used for introducing feed into kilns, with the addition of any suitable fuel mixing means.

While I have described the invention as applied to the treatment of incoherent powders, it should be understood that, if preferred, the powder having the fuel intermixed therewith may be formed into pieces of any desired shape and size and a stream of these pieces passed through the kiln.

It will also be understood that, while I have described the invention in connection with a rotary kiln, it is equally applicable to any elongated kiln, moving or stationary, in which the charge is moved at a controllable speed toward the end of the kiln into which the flame is introduced and is therefore in counterflow to the hot gases from the flame and to the air supply introduced therewith. Such kilns may have flat or inclined hearths and the mineral to be heated may be moved over the hearth by plows, scrapers, or other preferred means.

In the course of the foregoing, reference has repeatedly been made to calcination, flow rate, wet density, oil absorption, and acid solubility and as these are all trade terms having a specific meaning in the manufacture and testing of diatomaceous earth, it may be well to define them.

Calcination consists in heating the powdered earth to a temperature at which the combined water is driven off, the gelatinous silica and/or calcium silicate which usually occurs in the raw earth is converted into a hard but porous solid gel (e. g., silica gel), the organic matter (if any) is burned out, any soluble salts are converted into silicates, and the structure of the diatoms proper is hardened and toughened. The result of these changes is the development of properties highly desirable when the earth is to be used as a filter aid.

Calcination in the limited meaning above ascribed to the term rarely or never takes place below 1500° F., as the combined water is not driven off below that temperature. Above 1700° F. a pronounced shrinkage of the earth takes place, due to a partial sintering of the diatom structure in the presence of relatively small quantities of clays and other silicates. This shrinkage may amount to a reduction in volume of 15% or more, and results in a greater density and reduced porosity and flow rate.

The method of the instant application, which permits calcination to be conducted at a commercially economical rate while maintaining a temperature not materially above 1700° F. at any time or in any part of the charge makes possible the production of a calcined earth having the most desirable properties fully developed, while avoiding the disadvantages attendant on shrinkage, these results being producible, in methods heretofore used, only by an extremely tedious heat treatment in a single operation or by an equally tedious and costly double calcination with a comminuting operation interposed between the two burning steps.

Flow rate is a measure of the ability of an earth to remove very fine or colloidal suspensoids from liquids and to produce a high degree of clarity in the filtrate. In tests to determine the flow rate of a given earth a dose of the earth sufficient to produce a standard degree of clarity is suspended in a standardized sugar solution, the clarification of such solutions affording the principal market for filter aids. The suspension is placed in a filter and the amount of clarified filtrate delivered in a fixed period of time under an arbitrarily fixed pressure is the direct measure of the flow rate, which is converted into a relative measure by comparing the test yield with the yield from a standard sample of the same grade of finished earth. As a large yield of filtrate of the required clarity is probably the most desired characteristic of a filter aid, the larger the relative figure obtained in the above test the greater the value of the material.

The specific density or wet density is the actual weight in pounds per cubic foot of the compacted earth, as determined by centrifuging a weighed quantity of the earth from a relatively dilute suspension and measuring the volume of the compacted layer. A low wet density is an indication of high flow rate and absorption factor, and is desirable per se in all cases where the relation between weight and volume is a factor in the usefulness of the material, as, for example, in insulating compounds.

The oil absorption test is a direct measure of porosity, and a high oil absorption is valuable in all cases when solid bodies (e. g. battery boxes) are produced by saturating the earth with a semi-fluid such as asphalt.

The acid solubility figure represents the percentage weight of the earth dissolved in 65 parts by weight of sulfuric acid of 1.3 specific gravity in one hour at 205° F. A low acid solubility is desirable in an earth used for the manufacture of battery boxes or the lining of acid tanks, and in a filter aid used for the clarification of acid liquors.

I claim as my invention:

1. The method of calcining diatomaceous earth which comprises: comminuting said earth; intermixing with said earth a portion of the total quantity of fuel required for the calcination of said earth; continuously passing a stream of said mixture through a heating and combustion zone, and continuously passing through said zone in counterflow to said stream the fire gases produced by burning the remainder of said total quantity of fuel, together with air in quantity sufficient to consume the combustible portion of said intermixed fuel.

2. The method of calcining diatomaceous earth which comprises: comminuting said earth; intimately dispersing in said comminuted earth a portion of the total quantity of fuel required for the calcination of said earth, said portion being a liquid fuel; continuously passing a stream of said mixture through a heating and combustion zone, and continuously passing through said zone in counterflow to said stream the fire gases produced by burning the remainder of said total quantity of fuel, together with air in quantity sufficient to consume the combustible portion of said liquid fuel.

3. The method of calcining diatomaceous earth which comprises: comminuting said earth; intermixing with said earth a portion of the total quantity of fuel required for the calcination of said earth, said portion being in the form of a finely comminuted solid fuel; continuously passing a stream of said mixture through a heating and combustion zone, and continuously passing through said zone in counterflow to said stream the fire gases produced by burning the remainder of said total quantity of fuel, together with air in quantity sufficient to consume the combustible portion of said solid fuel.

4. The method of calcining diatomaceous earth containing naturally occurring combustible organic matter, which comprises: comminuting said earth; intermixing with said earth a further quantity of combustible matter; continuously passing a stream of said mixture through a heating and combustion zone, and continuously passing through said zone in counterflow to said stream the fire gases produced by burning a still further quantity of combustible matter, together with air in quantity sufficient to consume the combustible matter introduced into said zone in said stream.

5. The method of calcinating diatomaceous earth which comprises: comminuting said earth; intermixing with said earth a portion of the total quantity of fuel required for the calcination of said earth, said portion being in the form of finely comminuted diatomaceous earth containing naturally occurring combustible matter; continuously passing a stream of said mixture through a heating and combustion zone, and continuously passing through said zone in counterflow to said stream the fire gases produced by burning the remainder of said total quantity of fuel, together with air in quantity sufficient to consume the combustible constituents of first said fuel.

6. The method of calcining diatmoaceous earth which comprises: comminuting said earth; intermixing with said earth a portion of the total quantity of fuel required for the calcination of said earth; continuously passing a stream of said mixture through a heating and combustion zone; continuously passing through said zone in counterflow to said stream the fire gases produced by burning the remainder of said total quantity of fuel, together with air in quantity sufficient to consume the combustible constituents of said intermixed fuel, and controlling the temperature gradient within said zone by varying the quantitative relation between first said portion of fuel and said remainder of fuel.

7. The method of calcining diatomaceous earth which comprises: comminuting said earth; intermixing with said earth a portion of the total quantity of fuel required for the calcination of said earth; continuously passing a stream of said mixture through a heating and combustion zone; continuously passing through said zone in counterflow to said stream the fire gases produced by burning the remainder of said total quantity of fuel, together with air in quantity sufficient to consume the combustible constituents of said intermixed fuel, and directing the gases emerging from said zone into intimate contact with the supply of earth moving toward said zone, whereby combustible matter present in said gases is entrained by said earth and returned to said zone.

8. The method of calcining diatomaceous earth which comprises: passing said earth in suspension in a stream of heated gases through a comminuting effect; separating the comminuted earth from said gases; intimately intermingling with a stream of said separated earth a portion of the total quantity of fuel required for the calcination of said earth; passing said mixture in a stream through a heating and combustion zone; passing through said zone in counterflow to said stream the fire gases produced by burning the remainder of said total quantity of fuel, together with air in quantity sufficient to consume the combustible constituents of said intermixed fuel; removing the spent fire gases from said zone, and returning said gases to said comminuting effect for preheating said earth and for the recovery of combustible matter carried by said gases.

9. The method of calcining diatomaceous earth which comprises: comminuting said earth; intermixing with said earth a finely pulverized solid fuel yielding an ash having the property of decolorizing said earth when calcined therewith; continuously passing a stream of said mixture through a heating and combustion zone; supplying air to said zone to completely consume the combustible constituents of said fuel, and utilizing the incombustible constituents of said fuel to assist in the decolorization of said earth.

10. The method of calcining diatomaceous earth which comprises: comminuting said earth; intermixing with said earth a portion of the total quantity of fuel required for the calcination of said earth; passing a stream of said mixture through a heating and combustion zone; passing through said zone in counter-flow to said stream the fuel gases produced by burning the remainder of said total quantity of fuel, and supplying air to said zone in quantities sufficient to consume the combustible portion of said intermixed fuel, the quantitative relation of the fuel supplies and air being adjustable to regulate the characteristics of a calcined diatomaceous earth for its intended purpose.

11. The method of operating an elongated kiln comprising: continuously feeding into said kiln a supply of diatomaceous earth intimately intermixed with a quantity of fuel delivered from a regulable source and continuously moving a stream of said intermixture through the length of said kiln; producing combustion of said fuel whereby said earth is rapidly heated to a desired temperature at a point in said kiln adjacent the point at which said intermixture is fed; introducing the flame produced by burning a second supply of fuel into the end of said kiln from which said stream emerges; introducing into said kiln sufficient excess air to provide for the combustion of first said fuel supply, and passing said flame and said air through said kiln in counter-flow to said stream.

12. The method of calcining diatomaceous earth which comprises the steps of supplying within a kiln from a point adjacent one end thereof a stream of the material to be treated accompanied by a quantity of fuel supplemental to any fuel constituent associated with said material to be treated, and simultaneously supplying within the kiln fire gases from a point adjacent the opposite end thereof.

13. The method of calcining diatomaceous earth comprising the steps of supplying within an elongated kiln from a point adjacent one end of the kiln a stream of the material to be treated, accompanied by a supplemental quantity of fuel, simultaneously supplying within the kiln fire gas from a point adjacent the opposite end thereof, and relatively regulating the supply of supplemental fuel and the fire gas to control the zone of maximum temperature within the kiln.

14. The method of calcining diatomaceous earth comprising the steps of supplying within an elongated kiln from a point adjacent one end of the kiln a stream of material to be treated, accompanied by a regulated quantity of fuel intimately intermixed therewith, simultaneously supplying within the kiln fire gas from a point adjacent the opposite end thereof, and regulating the quantity of fuel to control the calcining conditions within the kiln.

McKINLEY STOCKTON.